(12) United States Patent
Gadant

(10) Patent No.: US 6,804,342 B1
(45) Date of Patent: Oct. 12, 2004

(54) PROCEDURE FOR ESTABLISHMENT OF COMMUNICATION BETWEEN TWO DATA TRANSMISSION TERMINALS AND TERMINAL FOR THE EMBODIMENT OF THE PROCEDURE

(75) Inventor: Hervé Gadant, Poissy (FR)

(73) Assignee: Sagem S.A., Paris (FR)

( * ) Notice: Subject to any disclaimer, the term of this patent is extended or adjusted under 35 U.S.C. 154(b) by 0 days.

(21) Appl. No.: 09/363,433

(22) Filed: Jul. 29, 1999

(30) Foreign Application Priority Data

Jul. 31, 1998 (FR) .......................................... 98 09857

(51) Int. Cl.[7] .............................................. H04M 3/42
(52) U.S. Cl. .............................. 379/210.01; 379/201.01
(58) Field of Search ........................ 379/210.01, 201.01, 379/210.02, 211.01, 211.02, 212.01, 209.01, 215.01, 207.14, 207.15, 207.01, 142.06, 142.08

(56) References Cited

U.S. PATENT DOCUMENTS

| | | | |
|---|---|---|---|
| 4,313,036 A | * 1/1982 | Jabara et al. | .................. 179/18 |
| 5,303,301 A | 4/1994 | Takahata | |
| 5,661,790 A | * 8/1997 | Hsu | .......................... 379/209 |
| 5,883,964 A | * 3/1999 | Alleman | ..................... 379/205 |
| 6,141,328 A | * 10/2000 | Nabkel et al. | ............... 379/259 |
| 6,463,144 B1 | * 10/2002 | Dunn et al. | ............ 379/210.01 |
| 2002/0141557 A1 | * 10/2002 | Strandberg | ............. 379/210.01 |

FOREIGN PATENT DOCUMENTS

| | | |
|---|---|---|
| EP | 0 802 663 | 10/1997 |
| EP | 0 862 342 | 9/1998 |
| GB | 2 268 663 | 1/1994 |
| WO | WO 93/22866 | 11/1993 |
| WO | WO 97/01252 | 1/1997 |
| WO | WO 97/28657 | 8/1997 |

OTHER PUBLICATIONS

Patent Abstract of Japan: vol. 098, No. 008, Jun. 30, 1998 & JP 10 065833 A (Tamura Electric Works Ltd), Mar. 6, 1998.
Patent Abstract of Japan: vol. 098, No. 011, Sep. 30, 1998 & JP 10 178466 A (Fuji Xerox Co Ltd), Jun. 30, 1998.

* cited by examiner

Primary Examiner—William J. Deane, Jr.
(74) Attorney, Agent, or Firm—Akerman Senterfitt

(57) ABSTRACT

A procedure to establish communication between two terminals for data transmission, designed to supply the identity of a calling terminal to a receiving terminal. The procedure includes memorization in terminals of a table with the numbers of the terminals of correspondents. At the time of a call, a command is given to the network to supply the identity of the calling terminal to the receiving terminal. In the receiving terminal, the identity of the calling terminal is compared against the content of the table. If the identities match, the receiving terminal calls back the calling terminal.

8 Claims, 2 Drawing Sheets

PROCEDURE FOR ESTABLISHMENT OF COMMUNICATION BETWEEN TWO DATA TRANSMISSION TERMINALS AND TERMINAL FOR THE EMBODIMENT OF THE PROCEDURE

FIELD OF THE INVENTION

In telephone network, the caller subscribers are normally billed for the calls.

BACKGROUND OF THE INVENTION

However there are exceptions, i.e. certain subscribers accept to pay the cost of the calls they receive, such acceptance being either systematic (toll-free number) or on a call by call basis depending on the identity of the caller, with payment against prior validation (collect call, abbreviated CC).

This invention concerns the latter mode of operation with individual agreement.

Classically, the subscriber called by another subscriber is warned of the CC call by a telephone operator, who obtains the consent of the person called before transferring the call.

Such operation has shortcomings.

Indeed, the person called must be present, so that a caller cannot transfer free of charge a voice message on the answering machine of the person called or a fax or any other data through a communications terminal. In addition, all network operators do not offer such service free of charge.

SUMMARY OF THE INVENTION

This invention intends to avoid these shortcomings by using currently known means to identify the caller.

For this purpose, the invention concerns, first of all, a procedure to establish a communication between two data transmission terminals of data transmission network organized in order to supply the identity of a calling terminal to a cold terminal, a procedure characterized by the fact that:

the terminals memorize a table of terminal numbers of correspondents, at the time of the call, command is given to the network to supply the identity of the calling terminal to the terminal called, in the terminal called, the identity of the calling terminal is compared to the content of the table and, if they are consistent, the terminal called-calls back the calling terminal.

Thus, the network itself is exploited in a banal way, without resorting to a free of charge calling service, and it is the calling terminal that commands remotely, depending on its identity, the terminal called so that the latter calls back, if it accepts, the calling terminal and/or one of several other pre-established terminals. Consequently, this identity is a control key of one or several actions of the terminal code.

The acceptance of a return call by the terminal called initially is memorized and identified according to the caller; thus, the terminal originating the call can, even in the absence of the subscriber at the terminal initially called, enter in communication with the latter and transmit to him all information, voice or data.

In particular, the invention has the advantage of allowing the bearer of a cell phone who cannot simply call another terminal to ask him to call back, to call from a booth pertaining to the switch telephone network in order to command remotely a call on his portable telephone.

Thus, the invention concerns a data transmission terminal for the embodiment of the procedure under the invention, including contact and numbering interface means on a line of a data transmission network and means to detect line signals representing an identity number of a calling terminal, characterized by the fact that it includes means for numbering processing in order to seek any number detected by the detection means in a memory table and, in this case, command a call to be made to a number corresponding to the number received, through the interface.

BRIEF DESCRIPTION OF THE DRAWINGS

The invention will be better understood with the following description of a preferred mode of embodiment of the procedure under the invention, in reference to the enclosed drawing, in which.

DETAILED DESCRIPTION OF EMBODIMENTS OF THE INVENTION

Figure 1:
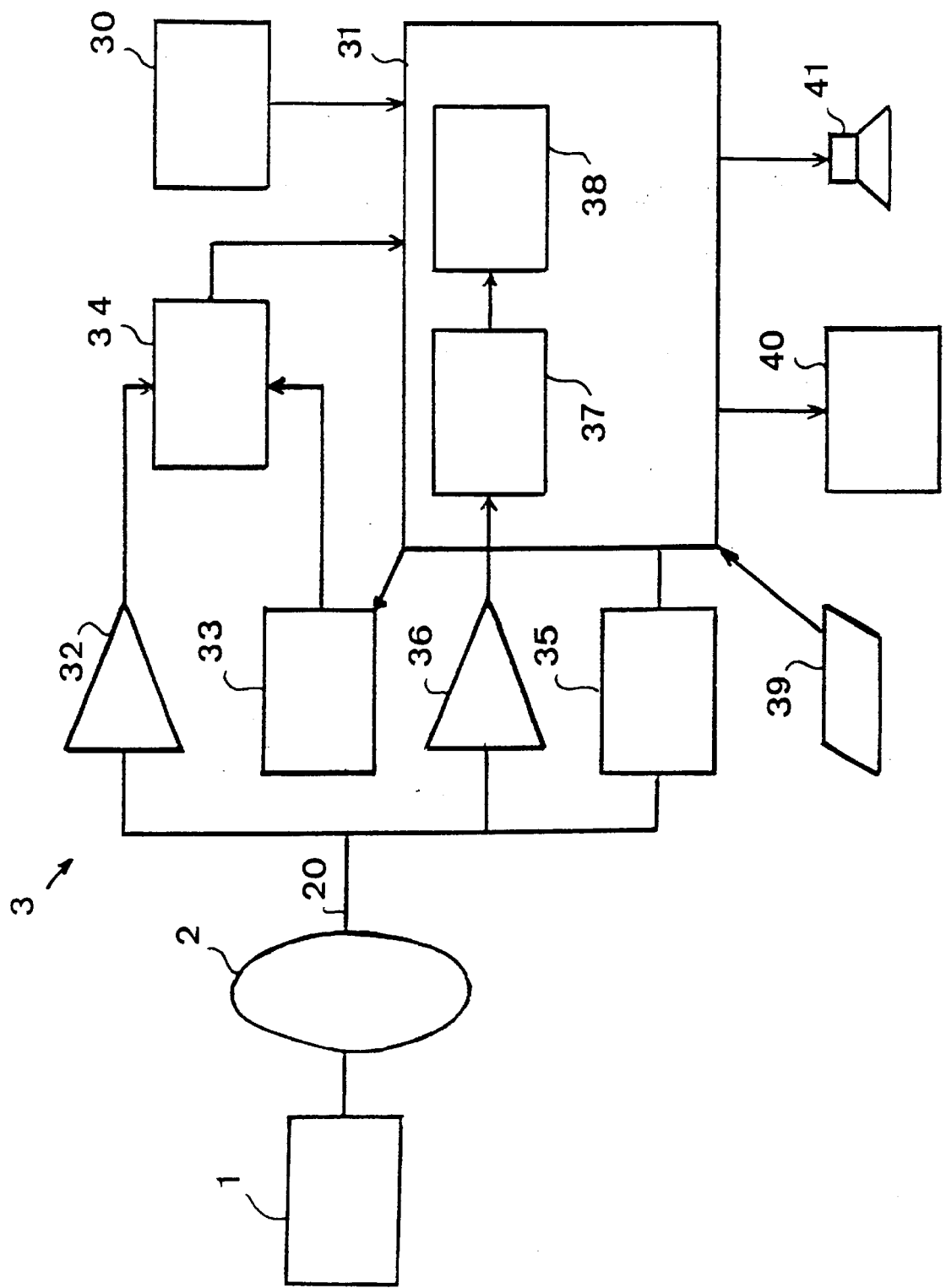
FIG. 1 represents two telephone sets connected to the switched telephone network, in order to embody the procedure under the invention

FIG. 1 represents two telephone sets, respectively referenced 1 and 3, connected to the switch telephone network RTC, 2.

Set 3 has circuits for the embodiment of the procedure. It contains a time base 30 basing the operation of a central unit with microprocessor 31, including temporizing circuits 37 for the detection for the stoppage of the call controlling the circuit counter 38 which measure the duration of the call and including an outlet threshold comparer.

A line 20 for connection to RTC 2 is connected to a receiver 32 of a caller's identity signals (CLASS service) supplied by the network 2, a detector 36 of ringing connected at the outlet to the microprocessor 31 and, in particular, to circuits 37, and an interface circuit 35, which picks up the line at the inlet/outlet and for numbering, controlled by the microprocessor 31.

The receiver 32 is connected to the inlet of a comparer 34, in which a second inlet is connected to a memory 33 which contains a table of subscribers (at least one) of the network 2, which have the capacity of being called back at their command by the set 3. The outlet of the comparer 34 is connected to the microprocessor 31. A keyboard 39, controlled by the microprocessor 31, allows the user to keep in the memory 33 the numbers desired and is equipped with a control screen 40 of these numbers. An incoming call is indicated by a bell connected to the line 20 through a switch controlled by the microprocessor 31 or by a buzzer 41 controlled by the latter.

The microprocessor 31 controls the various circuits by connections which are not all represented, in particular in order to process the numbering originating from the line 20.

Figure 2:
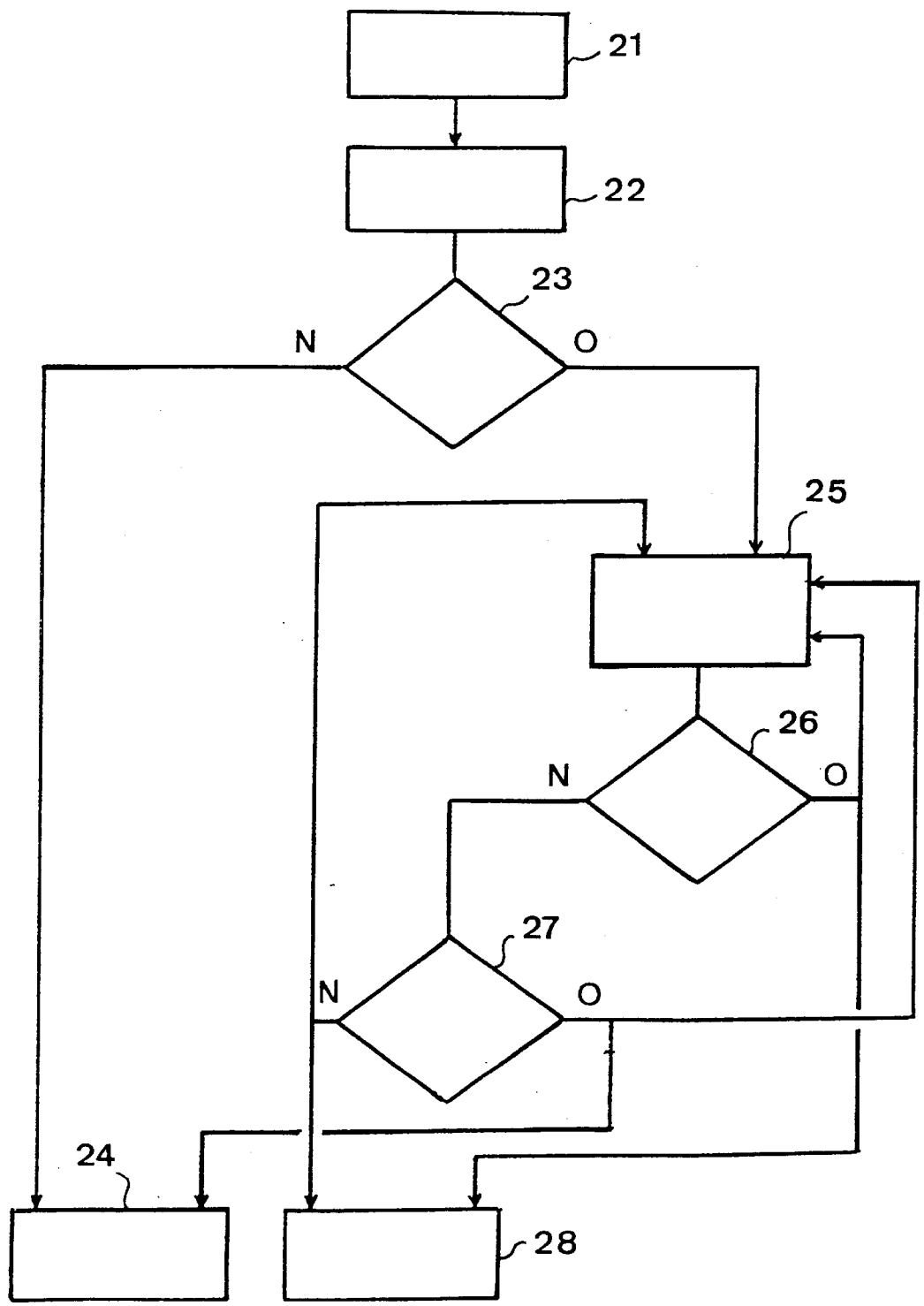
FIG. 2 is a chart explaining the procedure.

The chart in FIG. 2 illustrates the procedure.

In a stage 21, the user of the set 1 calls the set 3 through the network 2. The latter causes the cyclic sending of a series of analogical alternative call signals (or of corresponding numeric signals through a signaling channel in the case of a numeric connection of the type 2B+D). After the first series of signals, the caller's identification signals, i.e. the telephone number of the calling set 1 is transmitted to the receiving set 3 (CLASS service).

The latter previously terminated this first series of bell rings, in order to avoid the user of set 3 from picking up too quickly, which would interfere with the reception and operation of the class signals.

In a stage 22, the receiver 32 detects the CLASS signals and puts them in the logical form of a number, applied to the comparer 34.

The microprocessor 31, when informed of the incoming call and of the receipt of the CLASS signals, commands, in a stage 23, a scrolling of the content of the table in memory 33, which was initially established by entries made with the keyboard 39 and controlled by the screen 40. Thus, a vocal announcement would be possible. If a search in the table 33 of the CLASS number received is unsuccessful, the microprocessor 31 lets (or causes) the bell 41 to ring in a stage 24, in which it can command an answer pickup (pickup of the line 35) after another temporization, to establish an incoming switch and classically pass on the call to an answering machine, or any other data transmission terminal.

If stage 23 is successful, the microprocessor 31 counts the number T of impulse series in a stage 25 and, consequently, measures the current duration of the call by increments, with each series of bell rings received since the previously memorized count. In a stage 26, it tries to detect a termination of the call by the circuit 37 which then, in this case, blocks the advance of the circuit counter 38. Since the rings of the bell have a repetition cycle of 5 seconds and a duration of 1.6 s in this cycle, the temporization circuits 37 detect all unengaged time of the line exceeding 3.4 s, in practice 4 seconds, in order to include a safety margin.

As long as the termination of the call is not detected by the circuit 37, a stage 27 is carried out in which the number T is compared to a threshold value S in the circuits 38, i.e. to a number S of series in the circuit comparer 38, which number represents 5×S in seconds in this case. If the threshold S is not reached, the circuit comparer 38 commands a return to the counting stage 25. If the number T reaches the value S, the circuit comparer 38 (here a subtractor of the microprocessor 31), comparing by subtraction the number T to the threshold S, then changes status and returns the counting T of the stage 25 to zero, and passes on to stage 24 by commanding circuits 35, which takes or closes the line 20. This prevents all automatic recall. This indicates that the user of the set 1 did not hang up, because he wishes to establish a communication in the classic manner.

If, on the contrary, the user of the set 1 hangs up after a number of rings lower than S (reception by the set 1 of a real or fictitious echo signal from the bell), and therefore a communication is not established and there is no billing, this indicates that he wishes to transmit a remote callback command to set 3. This brief call by the set 1 can actually be done automatically by a sequencer included for this purpose in the set 1 and activated by key, calibrating the duration of the call for example at two or three bell rings. In this case, the detection of the stoppage of the call in stage 26 brings back to zero the counting T of the stage 25 and causes, in stage 28, a callback from set 3 to set 1, to the extent that, as indicated, the threshold S was not exceeded. Then, the microprocessor 31 command circuit 35 to pickup the line 20 and emit on it the CLASS number received. As indicated above, the return call may actually be directed to a terminal other than set 1, for example to a fax machine. It can also be provided to have a series of calls to several terminals. It is also possible for the set 1 to have different calling numbers through different networks (RTC, radiotelephone) and that it is preferable, for example due to cost, to call it preferably only through one of these networks. For this purpose, table 33 includes one or several calling numbers associated to the number of set 1, in order to transmit them to the circuit of the interface 35, which will call the corresponding number (s).

In order to avoid any untimely intervention of the user of the set 3, who, if he picks up too early, would interfere with the automatic device described above, the circuit threshold comparer 38 can be designed to suppress the operation of the bell 41 of the set 3, or any other bell by call signals coming from line 20, or by low level signals coming from the microprocessor 31, in order to warn this user only if reverting to stage 24 of classic operation. In that case, the incoming call is left waiting, without answering it by picking up the line.

It can be provided for certain callers (1) not to be able to establish a classic communication, but to always be called back. This variation corresponds to the operation of the "toll-free number." In this case, set 3 can call back set 1 as soon as it detects (22) its number after the first series of call signals, to the extent that it has a second line, analogical or numeric (2 B+D). If caller 1 has not hung up yet when he receives the return call, he is ringed as soon as he hangs up, and can therefore answer immediately to establish the incoming communication. The network 2 can also supply a tone indicating an incoming call, inviting to hang up set 1.

It can be imagined that the invention applies to all types of devices or data transmission equipment, such as voice and data devices and therefore to analogical or numeric transmissions on all wired or wireless networks.

I claim:

1. A process to establish communication between two terminals through a data transmission network designed to supply the identity of a calling terminal to a receiving terminal, the process comprising the steps of:
   storing a table in a memory of a receiving terminal, the table including the identities of terminals of network subscribers;
   a calling terminal calling, in an incoming call, a receiving terminal through the network;
   during this incoming call, the network supplying the identity of the calling terminal to the receiving terminal;
   in the receiving terminal, comparing the identity of the calling terminal to the content of the stored table; and
   if the identity of the calling terminal is found in the stored table, calling the calling terminal with the receiving terminal in a return call.

2. The process in accordance with claim 1, wherein the incoming call is left waiting in the receiving terminal, without being answered.

3. The process in accordance with claim 2, wherein the duration of the incoming call from the calling terminal is limited to a threshold S and, wherein call signals are detected in the receiving terminal in order to determine the duration T of the incoming call and, if this duration exceeds the threshold S, the duration that the incoming call is left waiting in the receiving terminal without being answered is limited to the value of the threshold S, authorizing the call to be answered after the threshold S.

4. The process in accordance with claim 3, wherein a line on which the incoming call is received is picked up to answer the incoming call by the receiving terminal when the threshold S is exceeded in order to immediately establish an incoming communication.

5. The process in accordance with claim 3, wherein the return call is inhibited when the threshold S is exceeded.

6. A terminal for data transmission for establishing communication between two terminals through a data transmission network, the terminal comprising:

means interfacing with a line of a data transmission network;

means for detecting signals transmitted on the line of the data transmission network representing an identification number of a calling terminal; and means for processing the calling terminal identification number detected by the detection means in order to look up the calling terminal identification number in a memory table of said terminal and, in order to initiate a return call, through the interface means, to the received calling terminal identification number, if the calling terminal identification number is included in said memory table.

7. The terminal in accordance with claim 6, further comprising circuits to detect call signals related to the input of a comparer circuit designed to compare the duration of the call signals to a threshold value S and to suppress the initiation of the return call by the processing means if the threshold S is reached.

8. The terminal in accordance with claim 7, wherein the comparer circuits are designed to suppress the initiation of a call warning by the processing means as long as the threshold S is not reached.

* * * * *